United States Patent
Arevalo Rodriguez

(10) Patent No.: US 9,637,216 B2
(45) Date of Patent: May 2, 2017

(54) AIRCRAFT STRUCTURE MADE OF COMPOSITE MATERIAL

(71) Applicant: Airbus Operations S.L., Getafe (ES)

(72) Inventor: Elena Arevalo Rodriguez, Getafe (ES)

(73) Assignee: Airbus Operations S.L., Madrid (ES)

( * ) Notice: Subject to any disclaimer, the term of this patent is extended or adjusted under 35 U.S.C. 154(b) by 0 days.

(21) Appl. No.: 14/585,877

(22) Filed: Dec. 30, 2014

(65) Prior Publication Data

US 2015/0183504 A1 Jul. 2, 2015

(30) Foreign Application Priority Data

Dec. 31, 2013 (EP) ..................................... 13382580

(51) Int. Cl.
| | | |
|---|---|---|
| *B64C 1/12* | (2006.01) | |
| *B64C 1/06* | (2006.01) | |
| *B32B 37/02* | (2006.01) | |
| *B32B 37/16* | (2006.01) | |
| *B32B 38/00* | (2006.01) | |
| *B64C 1/00* | (2006.01) | |

(52) U.S. Cl.
CPC ................ *B64C 1/12* (2013.01); *B32B 37/02* (2013.01); *B32B 37/16* (2013.01); *B32B 38/00* (2013.01); *B64C 1/061* (2013.01); *B64C 1/064* (2013.01); *B32B 2038/0076* (2013.01); *B32B 2305/34* (2013.01); *B32B 2305/74* (2013.01); *B32B 2605/18* (2013.01); *B64C 2001/0072* (2013.01); *Y02T 50/433* (2013.01)

(58) Field of Classification Search
CPC B64C 1/12; B64C 1/061; B64C 1/064; B64C 2001/0072; B32B 37/02; B32B 38/00; B32B 37/16; B32B 2038/0076; B32B 2305/74; B32B 2605/18; B32B 2305/34; Y02T 50/433

See application file for complete search history.

(56) References Cited

U.S. PATENT DOCUMENTS

| | | | |
|---|---|---|---|
| 5,223,067 A | 6/1993 | Hamamoto et al. | |
| 5,242,523 A * | 9/1993 | Willden | B29C 70/44 156/245 |
| 6,508,909 B1 * | 1/2003 | Cerezo Pancorbo | B29C 70/44 156/245 |
| 2008/0290214 A1* | 11/2008 | Guzman | B29C 43/10 244/119 |
| 2010/0239865 A1* | 9/2010 | Kallinen | B29C 70/46 428/411.1 |
| 2012/0034416 A1* | 2/2012 | Lutz | B64C 1/061 428/121 |

FOREIGN PATENT DOCUMENTS

FR 2977296 1/2013

OTHER PUBLICATIONS

European Search Report, Jul. 18, 2014.

* cited by examiner

*Primary Examiner* — Valentina Xavier
(74) *Attorney, Agent, or Firm* — Greer, Burns & Crain, Ltd.

(57) ABSTRACT

An aircraft structure made of composite material, comprising a skin reinforced longitudinally with stringers, and frames perpendicular to the stringers, each stringer comprising a head and two webs, and each frame having recesses in its web for the passage of the longitudinal stringers, such that an internal preform is provided in the gap existing between each stringer and the skin, filling the gap.

8 Claims, 2 Drawing Sheets

AIRCRAFT STRUCTURE MADE OF COMPOSITE MATERIAL

CROSS-REFERENCES TO RELATED APPLICATIONS

This application claims the benefit of the European patent application No. 13382580.2 filed on Dec. 31, 2013, the entire disclosures of which are incorporated herein by way of reference.

BACKGROUND OF THE INVENTION

The present invention relates to an aircraft structure made of composite material, in particular for panels of fuselages of aeronautical structures, or for similar aircraft structures.

It is common knowledge that the aeronautical industry requires structures that on the one hand withstand the loads to which they are subjected, meeting high requirements on strength and stiffness, and on the other hand are as light as possible. A consequence of this requirement is the more and more extensive use of composite materials in primary structures, because with appropriate application of said composite materials it is therefore possible to achieve an important weight saving relative to a design in metallic material.

Integrated structures in particular have proved to be very efficient in this respect. We speak of an integrated structure when the different structural elements are manufactured in one step. This is another advantage of the use of composite materials because with their condition of independent layers that can be laid up in the desired form, they offer the possibility of increasing integration of the structure, which moreover often produces a cost saving—equally essential when competing in the marketplace—as there are fewer individual parts to be assembled.

Aircraft fuselages can be made up of several panels, these panels being composed of skin, stringers and frames. The skin is reinforced longitudinally with stringers to reduce its thickness and so as to be competitive in weight, whereas the frames prevent general instability of the fuselage and may be subject to local loading. Within an aircraft fuselage we may encounter other structural elements, such as beams, which serve as framing for open sections of the fuselage or serve for supporting the loads introduced by the floor of the cabin of said aircraft.

For the time being, panels of aircraft fuselages are manufactured separately. From one side, the skin reinforced with stringers is manufactured as a single piece by using ATL and FP techniques and a curing cycle in autoclave. From the other side, CFRP contour frames are manufactured separately in RTM (Resin Transfer Molding) by using two main preforms (C-shaped+L stiffener). One of the functions of this L stiffener is to reinforce the mousehole area of the frame (i.e., the recesses for the passage of the stringers), which is one of the weakest areas of the frame.

Once the frames are manufactured, they are assembled to the skin reinforced with stringers by means of mechanical joints, such as rivets. This involves manufacturing and assembly processes which are relatively costly.

In recent years much effort has been devoted to achieving an ever increasing level of integration in the production of aircraft structures in composite material, so as to avoid the aforementioned disadvantages.

US 2012/0034416 A1, referring to a frame and a method for producing such a frame, discloses a frame for reinforcing the hull of a craft, particularly an aircraft, comprising at least one frame element shaped in accordance with the curvature of the hull and having recesses at the side facing the hull for the passage of longitudinal beams of the craft, said frame element further having a flange facing the hull, said flange disposed in a region of at least one of said recesses and extending along an outline of said one recess, each frame element being integrally formed from a fiber-reinforced plastic composite material and the recesses being designed as integral cut-outs of each frame element.

U.S. Pat. No. 5,242,523 A discloses a method for forming and curing an intricate structure of criss-crossing composite stringers and frames that are bonded to a skin panel. A structure constructed in accordance with this invention would be well-suited for use as a portion of an aircraft fuselage, a boat hull, or the like. The method is preferably practiced by applying uncured composite stringers to an uncured composite sheet panel. This is followed by placing cured frames crosswise over the stringers. The frames have openings at the locations where they intersect with the stringers which enables the frames to come into direct contact with the skin along most of their length. During the forming and curing process, the stringers are covered with a plurality of cauls, and the entire assembly of skin panel, stringers, frames and cauls is subjected to a vacuum bagging and curing process. The cauls serve to maintain both part shape and to control the flow of resin within the stringers as they are cured. Further, they probably eliminate the need for intermediate protective materials between the vacuum bag and the stringers.

The angle currently used between the webs of the omega-shaped stringers and the skin (about 50°) makes it difficult to manufacture frames with a continuous flange.

Besides that, there are certain limitations regarding the angle currently used for the omega-shaped stringers. This angle cannot be lower than a value, in order to be sure that the distance x between the feet of an omega-shaped stringer is lower than the distance y between feet of different omega-shaped stringers (stringers pitch). Additionally, the distance x between the feet of an omega-shaped stringer cannot be so high in order to avoid manufacturing issues during the lay-up of the skin.

The present invention aims to solve the disadvantages that have arisen previously.

SUMMARY OF THE INVENTION

An object of the invention is to obtain an aircraft structure made of composite material which is easier to manufacture.

The invention relates to an aircraft structure made of composite material, comprising a skin reinforced longitudinally with stringers, and frames perpendicular to the stringers, each stringer comprising a head and two webs, and each frame having recesses in its web for the passage of the longitudinal stringers, such that an internal preform is provided in the gap existing between each stringer and the skin, filling said gap, the stringers and the internal preforms being omega shaped, characterized wherein the distance x between the feet of a stringer is greater than the distance y between the feet of adjacent stringers.

By manufacturing the skin with omega-shaped stringers with these internal preforms, the angle $\alpha$ between the omega-shaped stringers web and the skin can be reduced, so the distance x between the feet of an omega-shaped stringer can be increased, which means that the number of stringers is reduced. This implies a recurring cost reduction for the same weight (as there are fewer stringers, the weight of the preforms is compensated). As the internal preform is cured or semicured, tooling currently needed during the cycle in autoclave to maintain the radius and inner shape can be removed, since the inner preform itself can do this role, which also implies cost reduction.

This angle reduction additionally makes the adaptability of the contour frames to the omega-shaped stringers easier, in order to facilitate the final integration.

Due to the reduced angle of the omega-shaped stringers, frame preforms can be manufactured more easily, avoiding cuts in corners and distortions or wrinkles of the frame web laminate around the mousehole.

The invention also relates to a method for manufacturing aircraft structures made of composite material that comprises the following steps:

a) the internal preforms are cured or semicured;
b) lay up of the fresh stringers and forming, including the internal preforms inside the stringers, the stringers and the preforms being omega shaped;
c) subassembly comprising the skin and the stringers, including the internal preforms inside, such that the distance x between the feet of a stringer is greater than the distance y between the feet of adjacent stringers;
d) lay up of the frames and forming;
e) the frames are placed in direct contact with the subassembly comprising the skin and the stringers;
f) final curing of the assembly comprising the skin, the stringers and the frames in a single process.

In this way, the structure can be finally cured in a single process, which is called "one shot", and a structure without the need of assembly tasks, such as riveting, may be obtained. This assembly simplification implies globally recurring cost savings.

Other characteristics and advantages of the present invention will become clear from the following detailed description of a typical embodiment of its object, referring to the accompanying drawings.

DETAILED DESCRIPTION OF THE PREFERRED EMBODIMENTS

Figure 1:
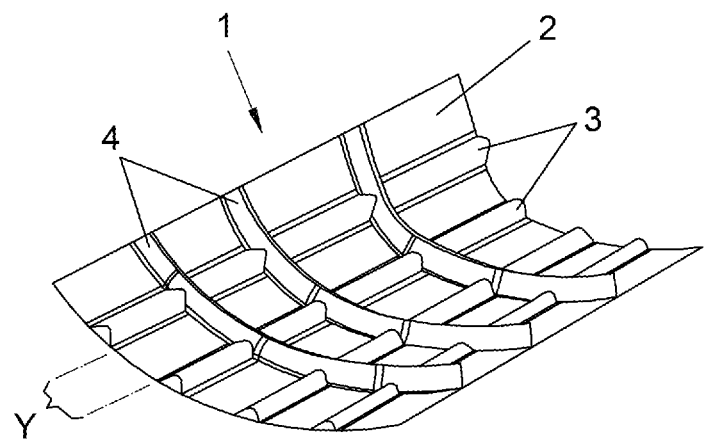
FIG. 1 shows an aircraft structure made of composite material.

FIG. 1 illustrates an aircraft structure 1 made of composite material.

These structures in general comprise a skin 2, longitudinal stringers 3 and transverse frames 4.

The structure according to the invention is an aircraft structure 1 made of composite material, which comprises a skin 2 reinforced longitudinally with stringers 3, and frames 4 perpendicular to the stringers 3. Each stringer 3 comprises a head 6 and two webs 7, and each frame 4 has recesses 10 in its web 9 for the passage of the longitudinal stringers 3.

Figure 2:
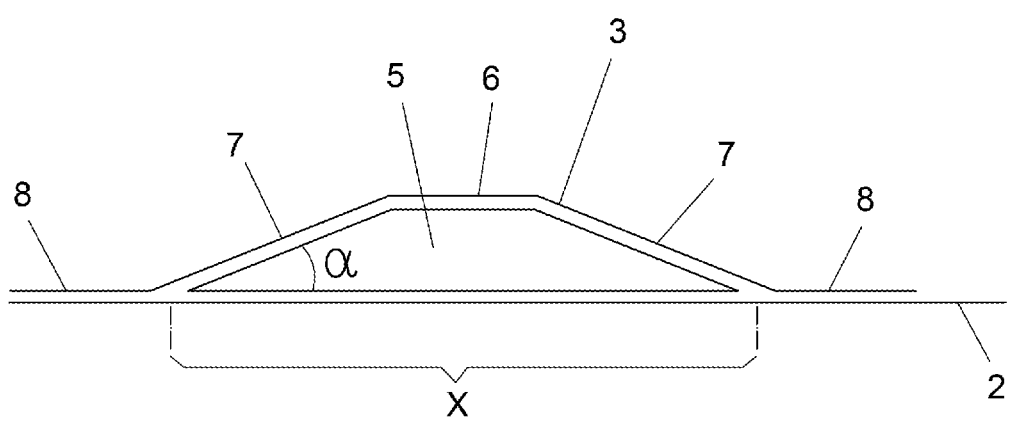
FIG. 2 shows a front view of a stringer with an internal preform.

As can be seen in FIG. 2, there is an internal preform 5 in the gap existing between each stringer 3 and the skin 2, filling said gap. FIG. 2 shows that the internal preform 5 inside the stringers 3 makes it possible to reduce the angle α between the stringers web 7 and the skin 2 in order to facilitate the final integration.

Besides that, the existence of the internal preform 5 allows a more continuous contact between the stringer 3 and the skin 2, and the load transfer is improved: not only the feet 8 of the stringer 3 are joined to the skin 2, but the preform 5 is also joined to the skin 2.

The distance x between the feet 8 of a stringer 3 is greater than the distance y between the feet 8 of adjacent stringers 3.

In an embodiment of the invention, the stringers 3 and the frames 4 are joined to the skin 2 by means of mechanical joints.

In another embodiment of the invention, the aircraft structure 1 is a highly integrated structure, in which the stringers 3 and the frames 4 are not joined to the skin 2 by means of mechanical joints.

Figure 3:
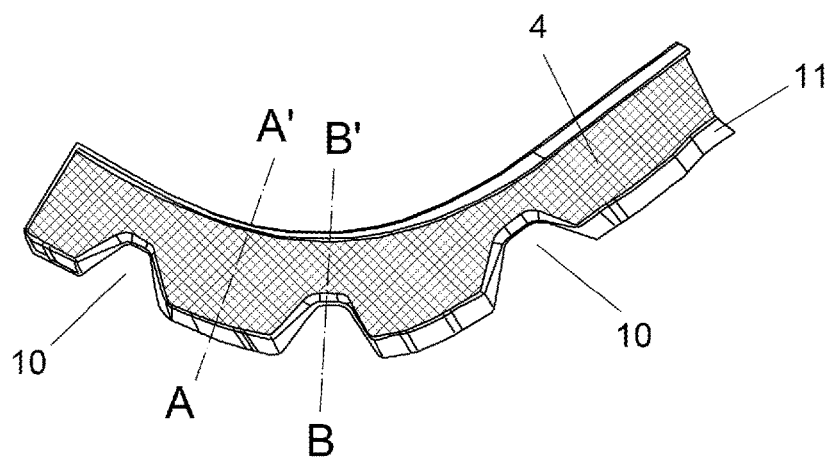
FIG. 3 shows a view of a frame.
Figure 4:
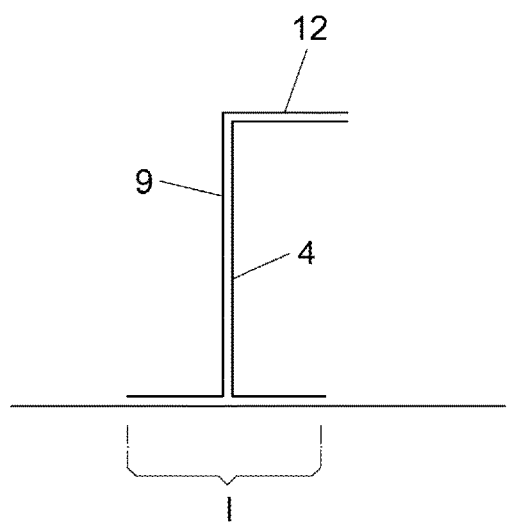
FIG. 4 shows a cross section of the frame of FIG. 3 at a point where there is not a recess for the passage of a stringer (A-A').
Figure 5:
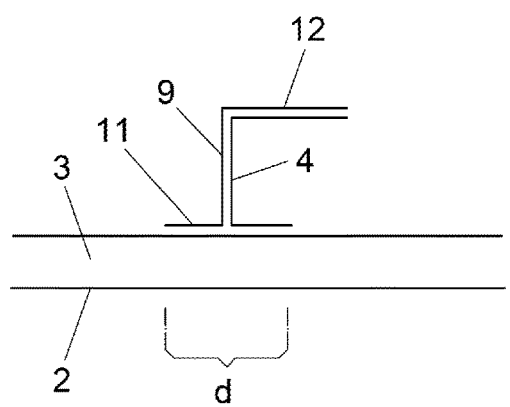
FIG. 5 shows a cross section of the frame of FIG. 3 at a point where there is a recess for the passage of a stringer (B-B').

FIG. 3 shows that each frame 4 comprises a lower flange 11 extending also along the contour of the recesses 10. FIG. 4 shows a cross section of a frame 4 at a point where there is not a recess 10 for the passage of a stringer 3 (A-A' cross section at FIG. 3) and FIG. 5 shows a cross section of a frame 4 at a point where there is a recess 10 for the passage of a stringer 3 (B-B' cross section at FIG. 3). In a preferred embodiment, the stringers 3 and the internal preforms 5 are omega shaped.

In the embodiment corresponding to a highly integrated structure, the angle α of the webs 7 of the omega-shaped stringers 3 with respect to the skin 2 and the angle of the webs of the internal preforms 5 with respect to the skin 2 is preferably between 35° and 47°.

Additionally, to improve the bonded interface between stringers 3 and frames 4, two preforms, one with C and the other with Z section, may be used to make the frames 4. When these two preforms are joined together with one caping, a J-shaped frame 4 is obtained. FIG. 4 shows a cross-section of a frame 4, in which the C shape and the Z shape can be seen.

The frames 4 of FIGS. 4 and 5 are J-shaped. The reason for that shape is that it allows the frame 4 to rest on the skin 2 (FIG. 4) or on the head 6 of the stringer 3 (FIG. 5) in a symmetrical manner Besides that, the bonded area is increased, because there are flanges 11 on both sides of the web 9 of the frame 4.

The method proposed by the invention to manufacture aircraft structures 1 made of composite material according to the invention comprises the following steps:

a) the internal preforms 5 are cured or semicured;
b) lay up of the fresh stringers 3 and forming, including the internal preforms 5 inside the stringers 3, the stringers 3 and the preforms 5 being omega shaped;
c) subassembly comprising the skin 2 and the stringers 3, including the internal preforms 5 inside, such that the distance x between the feet 8 of a stringer 3 is greater than the distance y between the feet 8 of adjacent stringers 3;
d) lay up of the frames 4 and forming;
e) the frames 4 are placed in direct contact with the subassembly comprising the skin 2 and the stringers 3;
f) final curing of the assembly comprising the skin 2, the stringers 3 and the frames 4 in a single process.

As the internal preform 5 is cured or semicured, tooling currently needed during the cycle in autoclave to maintain the radius and inner shape can be removed, since the inner preform 5 itself can do this role.

In the embodiments that we have just described, it is possible to introduce the modifications within the scope defined by the following claims.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft structure made of composite material, comprising:
   a skin reinforced longitudinally with stringers, and frames perpendicular to the stringers,
   each stringer comprising a head and two webs, and
   each frame having recesses in a web thereof for the passage of the longitudinal stringers, and
   an internal preform located in a gap existing between each stringer and the skin, filling the gap, the stringers and the internal preforms being omega shaped, wherein a distance x between the feet of a stringer is greater than a distance y between the foot of one stringer and the feet of an adjacent stringer.

2. The aircraft structure made of composite material, according to claim 1, wherein the stringers and the frames are joined to the skin by means of mechanical joints.

3. The aircraft structure made of composite material, according to claim 1, comprising a highly integrated structure, in which the stringers and the frames are not joined to the skin with mechanical joints.

4. The aircraft structure made of composite material, according to claim 3, wherein an angle $\alpha$ of the webs of the stringers and the angle of webs of the internal preforms with respect to the skin is between 35° and 47°.

5. The aircraft structure made of composite material, according to claim 1, wherein the frames are J-shaped.

6. A method for manufacturing aircraft structures made of composite material according to claim 1, comprising the following steps:
   a) curing or semicuring the internal preforms;
   b) laying up and forming the fresh stringers, including the internal preforms inside the stringers, the stringers and the preforms being omega shaped;
   c) subassembling the skin and the stringers, including the internal preforms inside such that the distance x between the feet of a stringer is greater than the distance y between the feet of adjacent stringers;
   d) laying up and forming the frames;
   e) placing the frames in direct contact with the subassembly comprising the skin and the stringers;
   f) finally curing the assembly comprising the skin, the stringers and the frames in a single process.

7. An aircraft structure made of composite material, comprising:
   a skin reinforced longitudinally with stringers, and frames perpendicular to the stringers,
   each stringer comprising a head, two webs, and two feet, the two feet being separated by a distance x, and
   each frame having recesses in a web thereof for the passage of the longitudinal stringers, and
   an internal preform located in a gap existing between each stringer and the skin, filling the gap, the stringers and the internal preforms being omega shaped and both being joined to the skin,
   wherein a distance between adjacent stringers is defined by a distance y between the foot of one stringer and the foot of an adjacent stringer, and
   wherein the x is greater than y.

8. An aircraft structure made of composite material, comprising:
   a skin reinforced longitudinally with stringers, and frames perpendicular to the stringers,
   each stringer comprising a head and two webs, and
   each frame having recesses in a web thereof for the passage of the longitudinal stringers, and
   an internal preform located in a gap existing between each stringer and the skin, filling the gap, the stringers and the internal preforms being omega shaped, wherein a distance x between the feet of a stringer is greater than a distance y between the foot of one stringer and the foot of an adjacent stringer,
   wherein an angle $\alpha$ of the webs of the stringers and the angle of webs of the internal preforms with respect to the skin is between 35° and 47°.

* * * * *